March 10, 1970  G. THEOCLITUS  3,499,480

FLAME SEALS

Filed Sept. 10, 1968

INVENTOR.
Gregory Theoclitus
BY
Wayne H. Lang
AGENT

United States Patent Office 3,499,480
Patented Mar. 10, 1970

3,499,480
FLAME SEALS
Gregory Theoclitus, Wellsville, N.Y., assignor to The Air Preheater Company, Inc., Wellsville, N.Y., a corporation of Delaware
Filed Sept. 10, 1968, Ser. No. 758,739
Int. Cl. F23l 15/02; F28d 19/04
U.S. Cl. 165—9
6 Claims

ABSTRACT OF THE DISCLOSURE

Sealing means for use in a rotary regenerative preheater whereby fluid leakage between relatively movable parts thereof is subjected to the heat of burning gases whereby noxious constituents of the escaping fluid are oxidized and thus reduced to an innocuous state.

BACKGROUND OF THE INVENTION

Field of the invention

Figure 1:
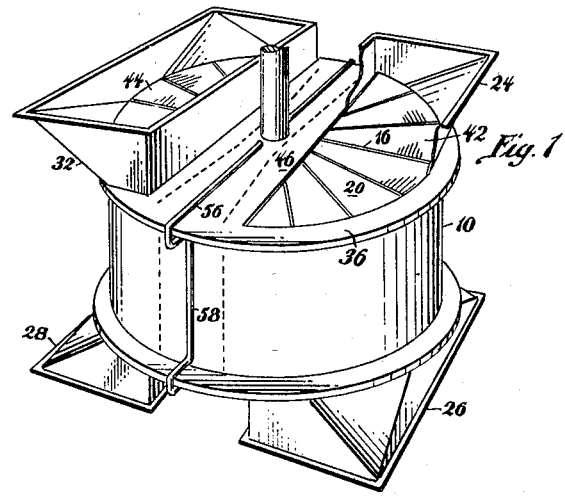

This invention relates to a rotary regenerative heat exchange apparatus having a mass of heat absorbent material which is alternately contacted by a heating fluid and a fluid to be heated. As the heat absorbent material contacts the heating fluid it absorbs heat therefrom only to give it up to the fluid to be heated. Sealing means on apparatus between the several fluids substantially precludes leakage therebetween, but some leakage inherently exists to contaminate the fluids or the surrounding air.

Description of prior art

In many cases where heat exchangers are used for heat economy, one or both of the fluids contain a toxic or an obnoxious constituent that makes intolerable the use therewith of an apparatus that permits leakage or cross-contamination of the fluids.

In general many applications thus preclude the utilization of rotary regenerative heat exchangers since some leakage of one fluid to the other cannot be completely eliminated. Although efficient mechanical sealing means have been developed for rotary regenerative heat exchange apparatus capable of effectively reducing leakage to the very small magnitudes satisfactory for most applications, there remains a strong possibility that the emission of minute quantities of toxic or odorous materials can still result in objectionable if not dangerous situations when exhausted or permitted to leak to the atmosphere.

Recent progress in the field of air pollution control has revealed that one of the most effective methods of eliminating many toxic and odorous materials is by direct flame incineration. In this method of fume elimination the gaseous fluid containing the undesirable contaminant is passed through a flame and subjected to oxidation whereby the contaminants are reduced to non-toxic or non-odorous by by-products.

Usually heat exchanger apparatus of the rotary type comprises a rotor that carries heat absorbent material which is first contacted by the hot gases before it is moved into a position in an air stream where it can transfer the heat absorbed from the hot gas to the cooler air. The rotor is surrounded by a housing having end plates formed with apertures between imperforate portions that direct the flow of gas and air through the rotor. To prevent mingling of the two fluids, sealing means are provided on the edges of the relatively movable bodies, however some of the fluid inherently escapes to an area of lower pressure by "direct" leakage between sealing means or by "entrained" leakage which comprises entrapment within the rotor. Fluid which is "entrained" within the rotor is usually exhausted out the stock into the upper atmosphere to effect little contamination of the surrounding air, however when the fluid which leaks "directly" from the heat exchanger is noxious in some manner and when the area of low pressure is the ambient atmosphere, it is obvious that the space surrounding the heat exchanger may become undesirable or untenable and the use of heat exchanges of the rotary regenerative type may at least be curtailed.

SUMMARY OF THE INVENTION

The present invention therefore relates to a device that applies the principle of flame incineration to rotary regenerative heat exchangers so as to prevent the leakage of undersirable contaminants from one fluid to the other and to the surrounding atmosphere. By this procedure it is proposed to subject fumes which by-pass conventional sealing devices to the action of a flame type incinerator whereby the obnoxious constituents thereof are incinerated and thus reduced to a non-odorous by-product, and it is a principal objective of my invention to therefore provide an arrangement which effectively reduces to an innocuous state the noxious gases which leak past the seals of a rotary regenerative heat exchanger.

Figure 2:
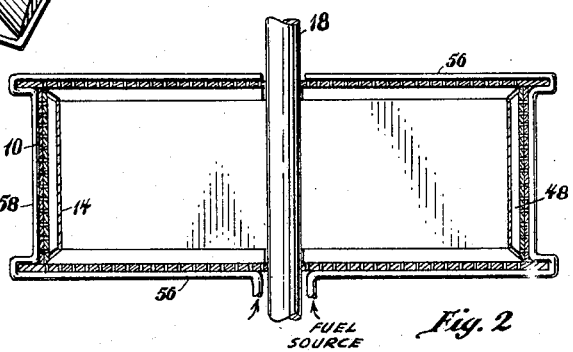
Figure 3:
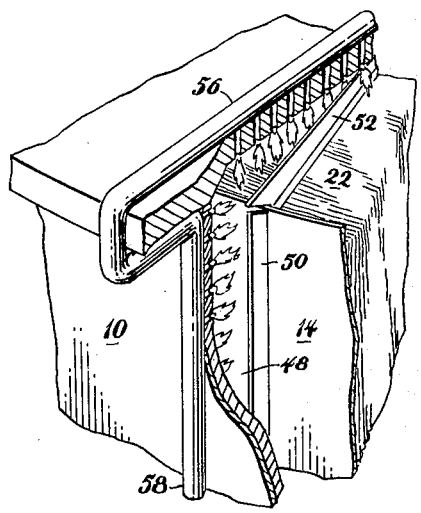
Figure 4:
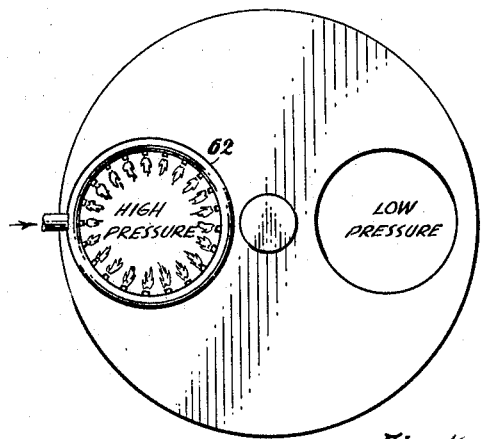

A more complete understanding of my invention may be realized by referring to the following description which may be reviewed in conjunction with the accompanying drawings in which:

FIGURE 1 is a perspective view of a rotary regenerative heat exchanger utilizing the present invention, FIGURE 2 is a sectional elevation of a typical heat exchanger showing the position of the burners with respect to high and low pressure sides of the heat exchanger, FIGURE 3 is a partial view in section showing the relationship between the rotor and surrounding housing of a rotary regenerative heat exchanger, and FIGURE 4 is a top view of a modified form of heat exchanger.

In the drawings a rotary regenerative heat exchanger comprises a cylindrical housing 10 that encloses a rotor comprised of a cylindrical shell 14 joined by radial partitions 16 to a central shaft 18 to produce a series of sectorial compartments 20 therebetween. The rotor is rotated slowly about its axis by a motor and reduction gearing arrangement of any suitable type not here illustrated. The rotor contains a mass of regenerative heat transfer material 22 that first absorbs heat from hot gases entering the heat exchanger through a duct 24 from a boiler or other source of heat to be discharged after passing over the heat exchange element through an outlet duct 26 to which an induced draft fan is usually connected. As the rotor turns slowly about its axis, the element that has been heated by the hot gases is moved into a stream of fluid to be heated that enters through a duct 28. After passing over the heated elements and absorbing heat therefrom, the heated fluid is discharged through a duct 32 and directed to a boiler furnace or other place of use.

The housing 10 enclosing the rotor 12 is provided at either end opposite ends of the rotor with sector plates 36 which are apertured in circumferentially spaced relation to admit and discharge streams of fluid to be heated that flow through the rotor. In order that the streams of heating fluid and the fluid to be heated do not commingle, the sector plates 36 include imperforate portions 46 located between the rotor openings. The imperforate portions of the sector plates are at least as large circumferentially as a sectorial compartment of the rotor to preclude by-passing of the rotor by the fluid streams and to effect the complete isolation at all times of at least one sector of the rotor which lies under the sector plate. In order that fluid streams will not flow through the annular space 48 between the rotor and the rotor housing, axial seals 50 are usually provided on the rotor shell 14 to cooperate with confronting face of the adjacent rotor housing to seal off the annular space from fluids flowing through the rotor. Similarly, radial seals 52 are provided on the radial end edges of the radial plates 16 to wipe against the surface of the end plate as the rotor passes thereby.

In spite of effective axial and radial sealing means that have been developed to preclude the leakage of fluid through the space between relatively rotatable parts of the rotor and the rotor housing, a slight leakage of fluid continues to exist. If the fluid entrained in the rotor and that which leaks from the space between relatively movable parts thereof contains obnoxious constituents, the ambient atmosphere will become contaminated therewith and the use of a rotary regenerative type heat exchanger will be precluded, even if otherwise desirable.

In accordance with this invention therefore, the entire passageway containing the obnoxious leakage fluid is surrounded by a system of pipes or ducts 56 connected to a source of fuel (not shown). The ducts are apertured to provide ports comprising burners which are spaced to encircle the passageway for the obnoxious fluid. Thus, as the obnoxious fluid leaks from its prescribed passageway it is forced to traverse a course intersected by a "wall of flame" emanating from the several burners. On passing through the "wall of flame," the waste gas containing the obnoxious constituents therein is oxidized and reduced to an innocuous form.

The precise placing of the burner arrangement may vary with the design of the rotary heat exchanger in the manner illustrated in FIG. 1 and FIG. 4 of the drawing. Thus with conventional rotary regenerative heat exchange apparatus of the Ljungstrom type, the end or sector plate 46 may be apertured to permit the passage therethrough of a fuel gas for combustion to comprise an elongate burner that is a source of the flames which are continuously directed across the annular space 48 and against the relatively moving rotor. Elongate burners 58 in the form of separate or continuous apertured pipes are also placed axially along the housing wall in the annular space between the rotor housing and the rotor with the apertures thereof directed toward the rotor so they comprise, with the apertures in the end plates, a burner ring which surrounds the rotor to separate one fluid from the other.

The multiple burners of the fume reduction device shown herein may produce a slight increase in the temperature of the rotor, however inasmuch as this heat is quickly absorbed by the fluid to be heated little such heat is actually lost. Moreover the flames of the burners which cooperate with the sealing device are also directed on to a continuously changing part of the rotor so that no single part thereof receives sufficient heat to be negatively affected by excessive heat.

Under somewhat different circumstances where, for example, the sealing means comprises an apertured plate that confronts the rotor as shown in FIG. 4, burner means may be incorporated therewith as ring burner 62 to subject the path of leakage between rotor and the sealing means to the incinerating action of a direct flame.

Inasmuch as leakage of noxious fumes to the atmosphere exists only where the pressure of the noxious fluid exceeds that of the atmosphere as shown in FIG. 4 of the drawing, a fume incinerating device is usually required only around the duct carrying the high pressure fluid.

Complete oxidation of the objectionable fumes within the leakage fluid may be achieved through other variations in design of the burner, influencing the temperature of the flame, or the time the fumes to be incinerated are in contact with flame, therefore it is evident that various changes may be made without departing from the spirit of the invention and it is intended that all matter contained in the above description or shown in the accompanying drawings shall be interpreted as illustrative and not in a limiting way.

I claim:
1. A regenerative heat exchange apparatus having a rotor containing a mass of heat absorbent material apertured to permit the flow of gas therethrough, a housing surrounding the rotor provided with inlet and outlet ducts that direct the flow of a heating fluid and a fluid to be heated through the apertures in spaced parts of the rotor, means for rotating the rotor about its axis within the housing, sealing means between the rotor and the rotor housing providing sealing between the heating fluid and the heated fluid, and burner means in the space between the rotor and rotor housing and adjacent said sealing means adapted to subject fluid leakage therethrough to the action of a flame whereby the noxious constituents therein are reduced to an innocuous state.

2. A regenerative heat exchanger having a rotor containing a mass of heat absorbent material forming a multiplicity of passageways extending therethrough, a housing surrounding the rotor provided with inlet and outlet ducts that direct the flow of a heating fluid and a fluid to be heated through spaced portions of the rotor, means for rotating the rotor about its axis wihin the housing to alternately subject said rotor to the action of the heating and cooling fluids, sealing means between the rotor and surrounding housing and adjacent said sealing means arranged to preclude the flow of fluid therebetween, and burner means in the space between the rotor and rotor housing adapted to subject the fluid leakage past said sealing means to the action of a flame to subject the combustible fumes therein to the process of combustion thereby reducing noxious constituents therein to an innocuous state.

3. A regenerative heat exchanger having a rotor containing a mass of heat absorbent material forming a multiplicity of passageways extending axially therethrough, a housing surrounding the rotor in spaced relation including inlet and outlet ducts that direct the heating fluid and the fluid to be heated through spaced portions of the rotor, means for rotating the rotor about its axis within the housing to alternately subject the heat absorbent material of the rotor to the heating fluid and the fluid to be heated, sealing means in the space between the rotor and rotor housing arranged to bridge the space therebetween and preclude the leakage of fluid through said space, and burner means in the space between the rotor and the rotor housing and adjacent said sealing means adapted to subject said space to the action of a flame whereby fluid leakage past said sealing means is subjected to the action of the flame and the combustible fumes therein are oxidized to an innocuous state.

4. A fume eliminator for use in apparatus having a rotor containing a mass of heat absorbent material as defined in claim 3 wherein the burner means is carried by the rotor housing.

5. A fume eliminator for use in apparatus having a rotor containing a mass of heat absorbent material as defined in claim 3 wherein the burner means encircles the inlet to one of said ducts.

6. A fume eliminator for use in apparatus as defined in claim 3 wherein the burner means has multiple nozzles which create an elongate wall of flame that separates the several fluids.

References Cited

UNITED STATES PATENTS 2,363,870  11/1944  Karlsson et al. _____ 165—7

LLOYD L. KING, Primary Examiner

A. W. DAVIS, Assistant Examiner

U.S. Cl. X.R.

165—5, 7